(12) United States Patent
Allen et al.

(10) Patent No.: US 8,761,183 B2
(45) Date of Patent: Jun. 24, 2014

(54) SYSTEM AND METHOD FOR CORE NETWORK TOPOLOGY ROUTER PLACEMENT PLANNING

(75) Inventors: John David Allen, Garland, TX (US); Rina R. Schneur, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1079 days.

(21) Appl. No.: 11/613,251

(22) Filed: Dec. 20, 2006

(65) Prior Publication Data

US 2008/0151777 A1  Jun. 26, 2008

(51) Int. Cl.
*H04L 12/28* (2006.01)
*H04L 12/56* (2006.01)

(52) U.S. Cl.
USPC .......................................... 370/397

(58) Field of Classification Search
USPC .................................. 709/220–226
See application file for complete search history.

(56) References Cited

U.S. PATENT DOCUMENTS

| | | | |
|---|---|---|---|
| 6,909,700 B1 * | 6/2005 | Benmohamed et al. | 370/255 |
| 7,143,283 B1 * | 11/2006 | Chen et al. | 713/153 |
| 7,599,385 B1 * | 10/2009 | Andrade et al. | 370/437 |
| 2004/0100950 A1 * | 5/2004 | Basu et al. | 370/389 |
| 2004/0107122 A1 * | 6/2004 | Behrens et al. | 705/7 |
| 2005/0078656 A1 * | 4/2005 | Bryant et al. | 370/351 |
| 2005/0232157 A1 * | 10/2005 | Tyan et al. | 370/237 |
| 2006/0182035 A1 * | 8/2006 | Vasseur | 370/238 |
| 2008/0046995 A1 * | 2/2008 | Satterlee et al. | 726/15 |
| 2008/0056137 A1 * | 3/2008 | Ravindran et al. | 370/238 |

* cited by examiner

*Primary Examiner* — Jason Mattis
*Assistant Examiner* — Adnan Baig

(57) ABSTRACT

Systems and methods for core network topology router placement planning are provided. The systems and methods may use existing network data to create a data set and use the data set to optimize a network for the placement of routers.

23 Claims, 7 Drawing Sheets

| Input Data |
|---|
| |
| $N$ = set of nodes |
| $K$ = set of candidate nodes, where $K \subset N$ |
| $S$ = set of nodes pre-selected to be equipped with a router, where $R \subset K$ |
| $D$ = set of demands |
| $P$ = { $P_d$ } = the set of all path configurations for all demands |
| $P_d$ = { configuration sets usable by demand d } = { $P_{dg}$ } |
| $P_{dg}$ = { path configurations in configuration set g of $P_d$ } |
| Nodes where routers are required if path configuration p is used |
| $\$192_c$ = per-OC192 cost for circuit c |
| $\$768_c$ = per-OC768 cost for circuit c |
| $\$R$ = cost of router commons (chassis) |
| $BW_p$ = bandwidth of path configuration p's demand |
| |
| Constants |
| OC192BW = OC192 bandwidth (in Mbps) |
| OC768BW = OC768 bandwidth (in Mbps) |
| |
| Other Pre-calculated Variables |
| $NA192_c$ = # OC192s required to carry demand from customer access/egress to/from 1st router |
| $S_d$ = 1 if only 1 path exists between demand d's source and destination nodes; otherwise 0 |
| |
| Decision Variables | |
| $W_p$ = 1 if path configuration p is used as a Working path; otherwise 0 | (boolean) |
| $P_p$ = 1 if path configuration p is used as a Protect path; otherwise 0 | (boolean) |
| $R_n$ = 1 if node n selected as a router node; otherwise 0 | (boolean) |
| $N192_c$ = # OC192s used in circuit c | (integer) |
| $N768_c$ = # OC768s used in circuit c | (integer) |
| $CoreBW_c$ = bandwidth required to carry traffic routed on core circuit c | (float) |

FIG. 6

| Results Variables |
|---|
| Nodes selected to be equipped with routers |
| Network cost (routers + transport) |
| Router utilization (fraction of Juniper T640 capacity) |
| Circuit BW, # of OC192 & OC768 channels |
| Link capacity requirements (# OC192/768 and BW) |
| Each demand's selected W and P paths |
| For each demand, router to which each source/destination node is homed (unless source or destination itself has a core router) |
| Transit traffic at each router |

FIG. 7

SYSTEM AND METHOD FOR CORE NETWORK TOPOLOGY ROUTER PLACEMENT PLANNING

BACKGROUND OF THE INVENTION

A computerized network contains more than one node and more than one link between the nodes. In large scale networks involving large amounts of nodes and links and transporting a large amount of traffic, IP network design and transport network design is crucial. Efficient network designs reduce network traffic problems, try to ensure that all nodes can access and send traffic efficiently, and may ensure that the failure of one node or link does not endanger the rest of the nodes and links from functioning effectively. Efficient network designs also minimize the overall cost of the network, by effectively utilizing links and positioning core routers in a way to minimize the total number of core routers.

IP network design and transport network design are typically completed as separate tasks. Implementing and optimizing one first and then the other may not optimize the overall network, resulting in an overall sub-optimal network design.

BRIEF DESCRIPTION OF THE DRAWINGS

Various embodiments may best be understood by reference to the following description taken in conjunction with the accompanying drawings, in the several Figures of which like reference numerals identify like elements, and in which:

FIG. 6 is a table of input variables according to an embodiment; and

FIG. 7 is a table of result variables according to an embodiment.

DETAILED DESCRIPTION OF PREFERRED EMBODIMENTS

The following description is intended to convey a thorough understanding of the embodiments described by providing a number of specific embodiments and details involving systems and methods for a core network topology router placement system. It should be appreciated, however, that the present invention is not limited to these specific embodiments and details, which are exemplary only. It is further understood that one possessing ordinary skill in the art, in like of known systems and methods, would appreciate the use of the invention for its intended purposes and benefits in any number of alternative embodiments, depending on specific design and other needs.

According to various embodiments, a network topology in which one or more nodes are specified is given. One or more nodes may be specified as candidates for a core router, and other nodes may not be candidates for core routers. One or more links within the network topology may connect the one or more nodes. Circuits may span the one or more links and connect candidate nodes. Between the one or more nodes, traffic demands may exist such that a certain amount of traffic flows from a source node to a destination node. Each of the links, and each of the core routers and ports connecting the core routers to the links, may have an associated cost. The nodes and links and costs may be expressed in a data file. As described, a data file and also other information may be read and used as input in a mathematical model. The mathematical model may also have rules and constraints intended to yield a valid and functional network design. The input variables and the model rules may be used to solve the mathematical model to create a lowest-cost network design which may be valid within the mathematical rules of the model.

Figure 1:
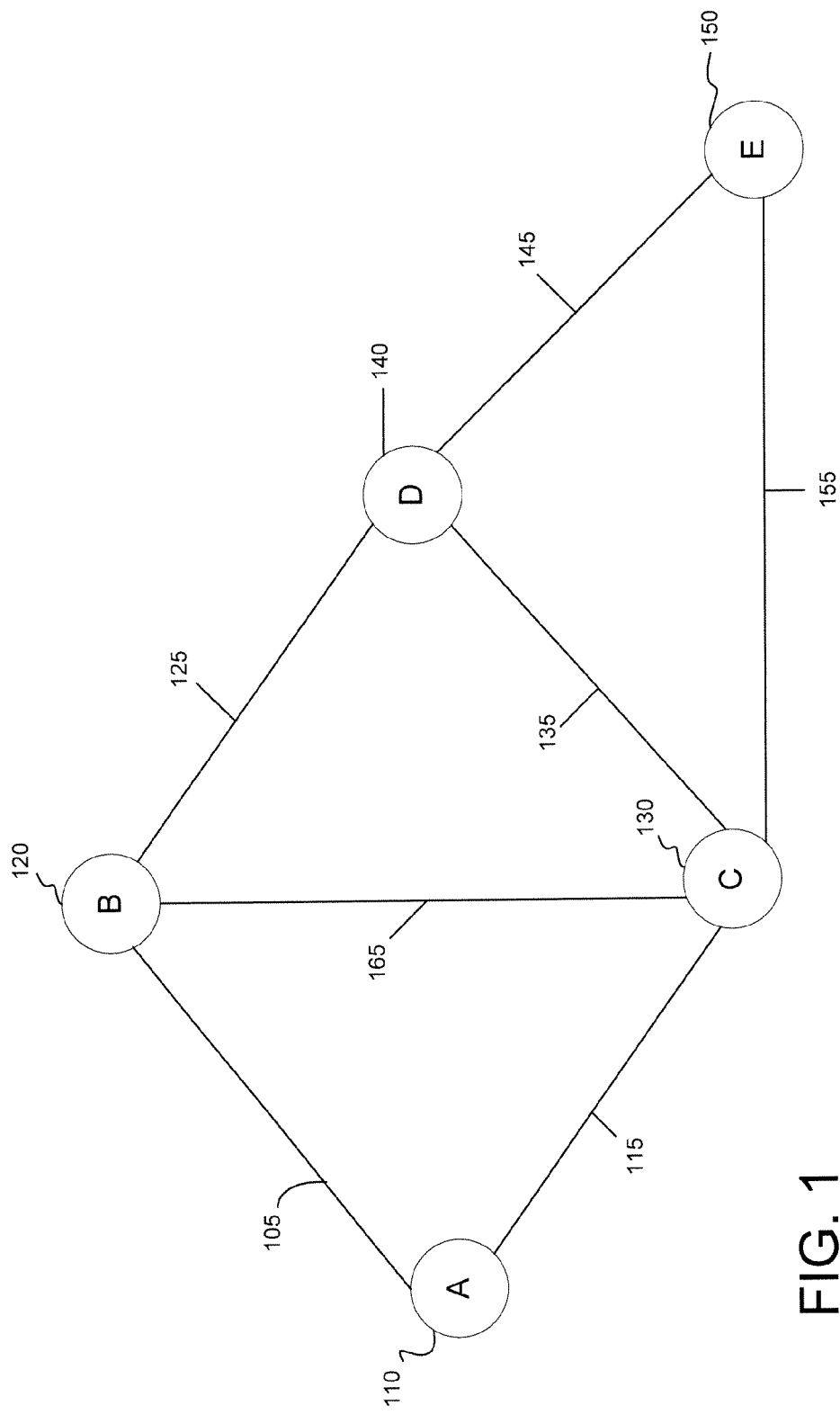
FIG. 1 is a exemplary network diagram showing nodes and links according to an embodiment.

Turning to FIG. 1, an exemplary network is shown. The network may contain one or more nodes. Interconnecting the nodes may be links, which may carry traffic from one node to another node. A node may be an endpoint for a link. For example, in the exemplary network, nodeA 110 may be connected by linkAB 105 to nodeB 120. Nodes may be connected to more than one other node. For example, in the exemplary network, nodeC 130 may be connected by linkAC 115 to nodeA 110, by linkBC 165 to nodeB 120, by linkCD 135 to nodeD 140, and by linkCE 155 to nodeE 150.

A link may be any kind of communication transport mechanism as known in the art. For example, a link may be one or more strands of fiber optic cable, one or more strands of metallic wire, or may be one or more radio transmitters communicating over one or more radio frequencies to one or more radio receivers to enable remote wireless communication between one node and another node.

A link may be associated with a link cost. The link cost may be the cost to operate or to use the link between the nodes. For example, linkAB 105 may be leased at a cost of $1,000 per month or at a cost of $1 per megabyte of data transferred. LinkAB 105 may also be owned, and then the cost may be the cost to the company to operate the link or the cost to the company to purchase the link. Different links may have different costs associated with them, so for example linkAB 105 may have a link cost of $1,000 per month and linkAC 115 may have a link cost of $10,000 per month.

A link may also be associated with a link capacity. The link capacity may be the maximum amount of data that the link can transmit. If the link is composed of one or more strands of fiber optic cable, then the capacity may be referenced in terms of optical carrier units for synchronous optical networking. For example, linkAB 105 may have a capacity of OC-192 or OC-768. Of course, the capacity for a link may be expressed in other ways, for example in megabits per second or megabytes per second. Different links may have different link capacities associated with them, so for example linkAB 105 may have a link capacity of OC-192 and linkAC 115 may have a link capacity of OC-768.

A core router may be a router that is operable to effectively handle a higher amount of traffic than a non-core router. A core router may have a chassis and one or more ports. Each port may connect one link to the core router. For example, a core router placed at nodeB 120 of the exemplary network diagram may require three ports, one for linkAB 105, one for linkBC 165, and one for linkBD 125. A core router may be associated with a router fixed cost and one or more router port costs. The router fixed cost may be the cost of the chassis. The router fixed cost may include the cost involved to purchase or lease the router or may also include maintenance or installation costs. A core router at one node may have a different router fixed cost than a core router at a different node. The router port cost may reflect the cost of operating the particular port in the core router, or may reflect other costs. If a router has more than one port, then each port may have a different router port cost. For example, a core router placed at nodeB 120 of the exemplary network diagram may have three ports. PortAB may be connected to linkAB 105 and may have a port cost of $4,000. PortBC may be connected to linkBC 165 and may have a port cost of $5,000. PortBD may be connected to linkBD 125 and may have a port cost of $6,000. The router fixed cost for a router at nodeB 120 may be $10,000, but the router fixed cost for a router at nodeC 130 may be $20,000.

An edge router may be a router that is not a core router and that may be a source node or a destination node. Each of the nodes that does not contain a core router may have an edge router. The homing distance for an edge router may be the total number of edge routers that traffic must traverse from a source node, which may be an edge router, to a core router. The homing distance may also be the total number of edge routers that traffic must traverse from a core router to a destination node. The maximum homing distance may be the maximum number of nodes that the traffic may traverse before it may be transmitted from a source node to a core router.

Each of the nodes may be a candidate node or not a candidate node. A candidate node may be a node which may contain a core router, if the optimized model suggests core router placement at the node. A node which is not a candidate node may not contain a core router. Several reasons to select candidate nodes and non-candidate nodes may exist. For example, the links to a non-candidate node may not have enough capacity to justify having a core router, or the expense to operate a core router at the node may be prohibitive, or not enough traffic may flow through the node to justify having a core router.

A source node may be the node that initially sends the network traffic. A destination node may be the node that finally receives the network traffic from the source node. Between each source node and destination node there may be a demand requirement. The demand requirement between two nodes may represent the amount of network traffic that the source node transmits to the destination node. The demand requirement may be measured in any way known in the art. For example, a demand requirement of 10 megabytes per second between nodeA 110 and nodeE 150 in the exemplary network diagram may indicate that a capacity of at least 10 megabytes per second of traffic may be established in the network between nodeA 110 and nodeE 150. As explained more fully below, traffic demands may be exclusive of any one link capacity. For example, the traffic indicated between nodeA 110 and nodeE 150 may all take one route, or may take more than one route. Each node may have a traffic demand value for each other node in the network.

Figure 2:
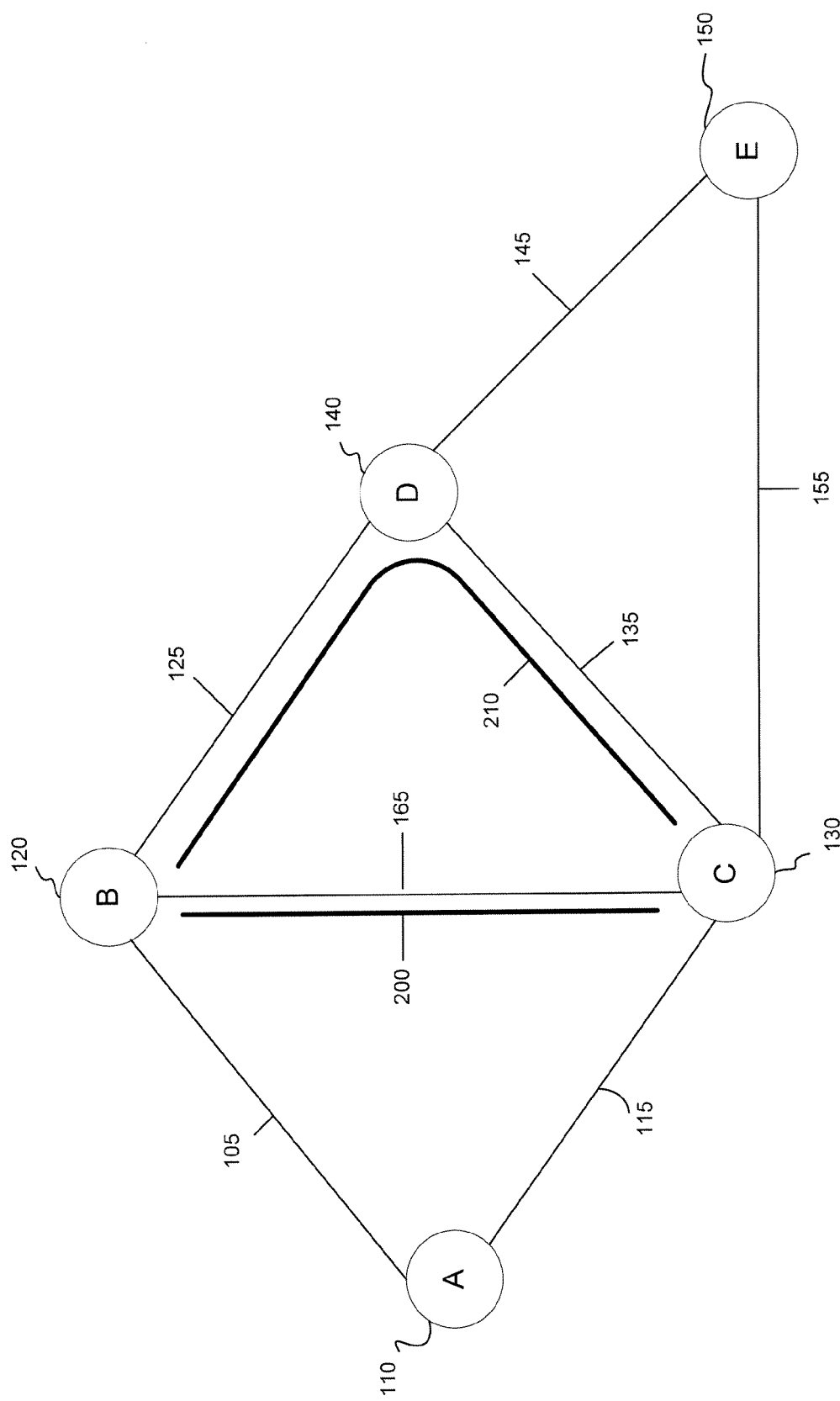
FIG. 2 is a exemplary network diagram of FIG. 1, further showing exemplary circuits according an embodiment.

Turning now to FIG. 2, the exemplary network of FIG. 1 is shown with two circuits added. A circuit may be a connection between two candidate nodes. A circuit may include more than one link. For example, two circuits connecting nodeB 120 to nodeC 130 are shown. Circuit 200 may be coterminous with linkBC. Circuit 210 may traverse linkBD 125 and linkCD 135, but may still connect nodeB 120 to nodeC 130. Circuits may be used to connect the core routers.

Figure 3:
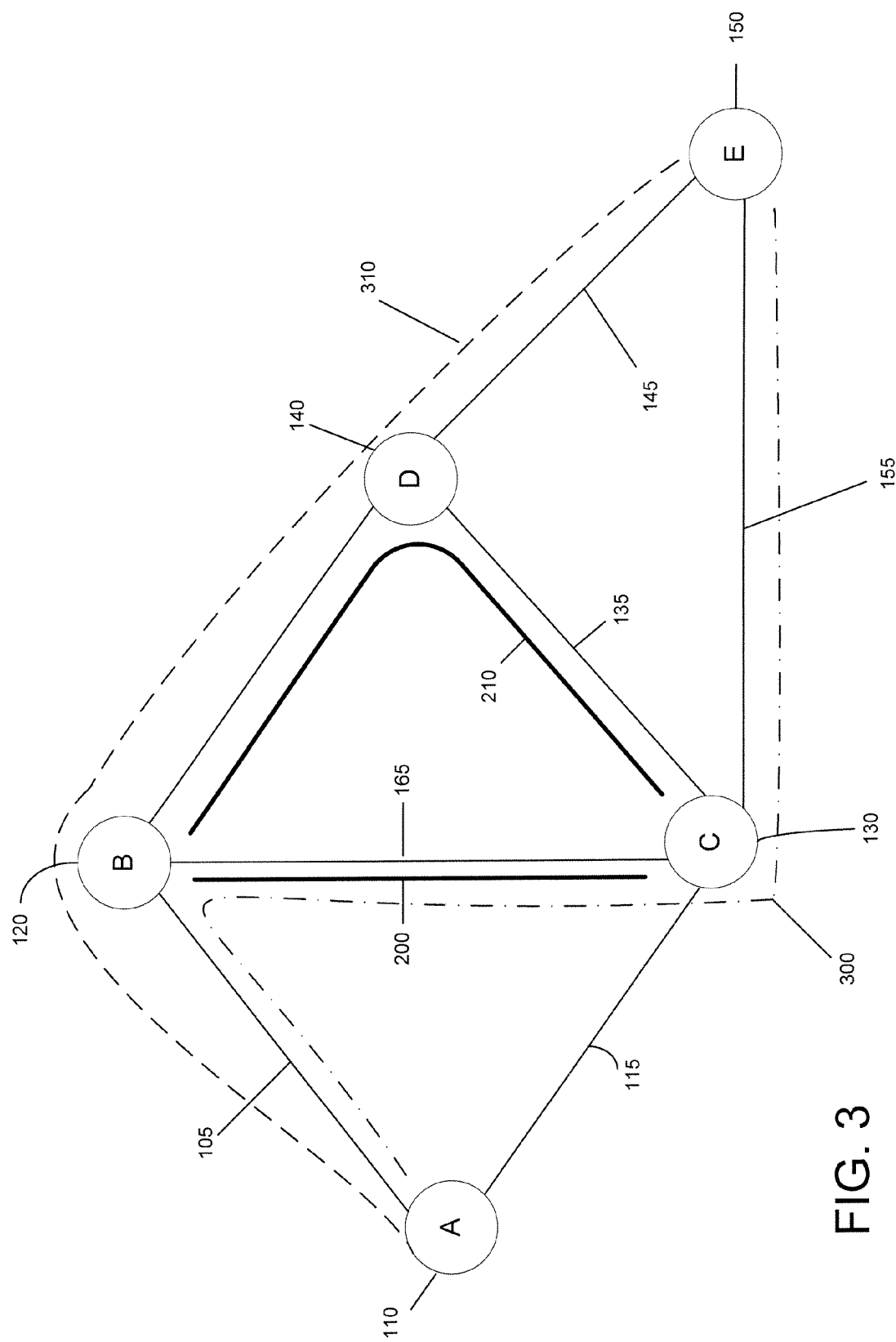
FIG. 3 is a exemplary network diagram of FIG. 2, further showing exemplary routes according to an embodiment.

Turning now to FIG. 3, the exemplary network of FIG. 2 is shown with a primary and a secondary path indicated. A path configuration may be a connection between a source node and a destination node. In the exemplary network shown in FIG. 3, nodeA 110 may be a source node and nodeE 150 may be a destination node. A configuration set may be a set of path configurations that may use the same physical path (i.e., use the same nodes and links to connect a source node and a destination node), but where every path configuration may use a different combination of circuits. By using a different combination of circuits, each path configuration in the configuration set may require placement of core routers at different nodes within the network.

A primary path 300 is shown in FIG. 3 between nodeA 110 and nodeE 150. The primary path may be the route that traffic takes between the source node and the destination node. In the exemplary network, the primary path 300 may traverse linkAB 105, nodeB 120, linkBC 165, nodeC 130, and linkCE 155 to get to the destination node. A link between two nodes may be severed. If a link is severed, then all of the circuits that traverse the link may not be functional. In the event a one or more of the links or nodes traversed in the primary path is nonfunctional, a secondary or restoration path 310 may also be available. The secondary path 310 in the exemplary network may traverse linkAB 105, nodeB 120, linkBD 125, nodeD 140, and linkDE 145 to get to the destination node. Many possible variables may influence the choice of a path as a primary path 300 or a secondary path 310. For example, one path may be shorter from the source node to the destination node, or the link costs and/or router costs may be lower.

A network may include, but is not limited to: e.g., a wide area network (WAN), a local area network (LAN), a global network such as the Internet, a telephone network such as a public switch telephone network, a wireless communication network, a cellular network, an intranet, or the like, or any combination thereof. In an exemplary embodiment, the network may include one, or any number of the exemplary types of networks mentioned above operating as a stand-alone network or in cooperation with each other. Use of the term network herein is not intended to limit the network to a single network.

Figure 4:
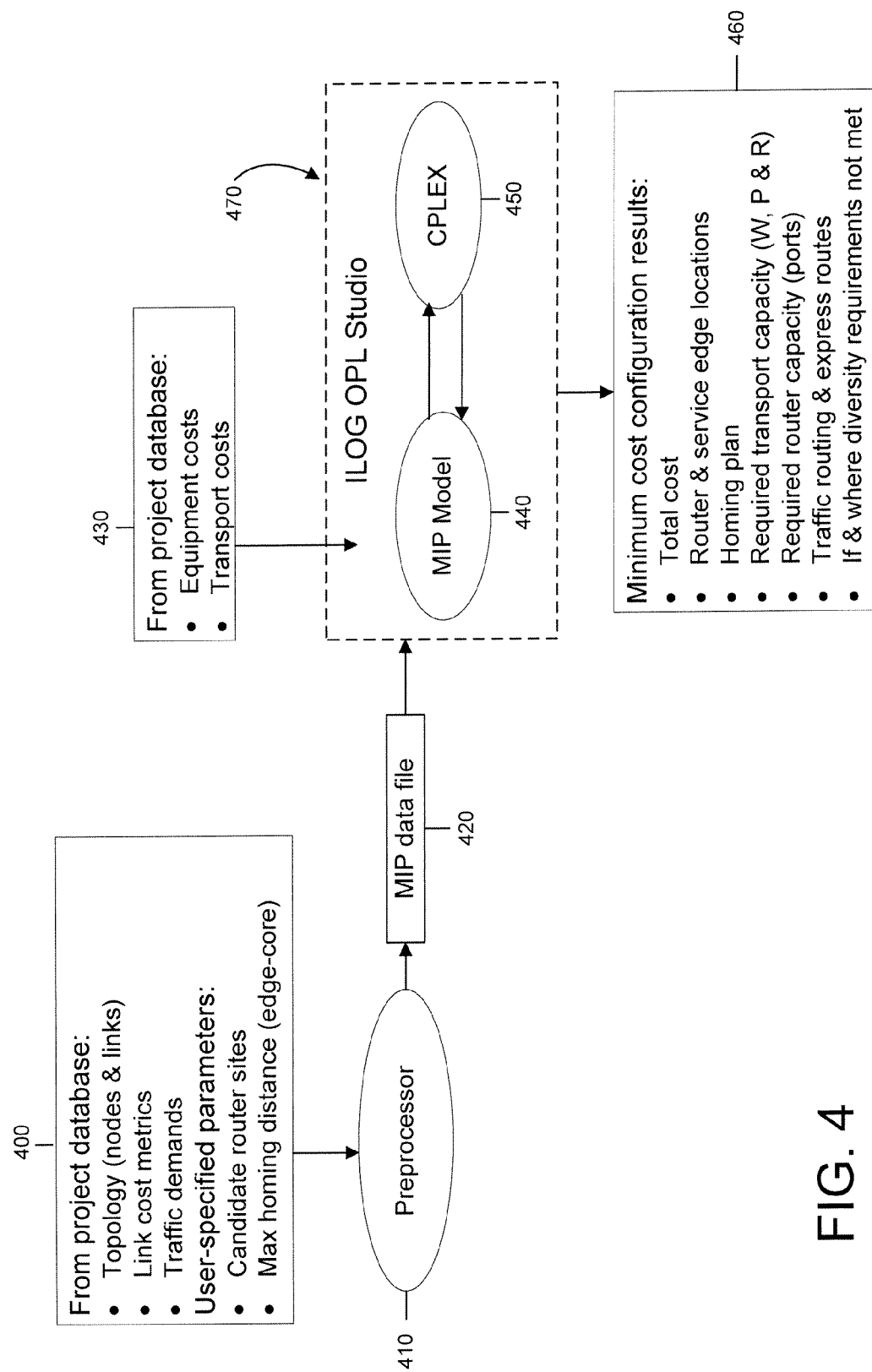
FIG. 4 is a system level block diagram showing a system with exemplary inputs and outputs according to an embodiment.

Turning now to FIG. 4, a system level block diagram is shown that clarifies the method of an embodiment. Block 400 represents the input data that may be required for the method to generate accurate results. The input data may include the network topology (i.e., a list of the nodes and the links between the nodes). The input variables may also include the link cost amounts, which may be unique to each link. The input variables may also include the traffic demands between the nodes. As explained more fully above, the traffic demands may include the traffic figures from each node to each other node. The traffic demands may be estimates or may be empirically derived. Other variables may also be included which are defined by the operator of the method. While all variables may be manipulated by the operator of the method, the operator may be able to more freely manipulate the user-specified parameters to still yield valid results. For example, the operator may choose the candidate nodes which the method may assign for a core router. In changing the possible locations of the one or more core routers in the network, the operator may change the dynamics of the model. Another user-defined parameter is the maximum homing distance from an edge router to a core router. In changing this variable, the operator may also alter where the model positions core routers in the network.

The preprocessor shown in block 410 may operate on the input data to create a mixed integer program data file for use with the mixed integer program model and the commercial solver software.

The mixed integer program data file may be entered into the mixed integer program model. The mixed integer program model may contain the mathematical problems for the method. One possible example of the mathematical problems to be solved is described above. Other variable data may also be entered into the mixed integer program model. For example, in block 430, router costs, router link costs, or other transport costs may be entered into the mixed integer program model.

In addition to the input data, the mixed integer program model may also have other mathematical constraints that are imposed on the model to allow for a more efficient network diagram. For example, a rule may exist that a core router may only be placed at a candidate node. The model may create an error situation if it was necessary to place a core router at a non-candidate node. Or, a rule may exist that one primary path, which consists of at least one circuit, must exist between a source node and any destination node that the source node must send traffic. A rule may exist that one or more secondary paths, which consist of at least one circuit, must exist between a source node and any destination node that the source node must send traffic. A rule may exist that, given a primary path and a secondary path between a source node and destination node, the circuits used with the primary path and the secondary path may not overlap, so that a failure of one of the circuits between the source node and the destination node would not cause a failure of both the primary path and the secondary path at the same time. A rule may exist that an access or egress circuit that does not directly connect a demand's source node with its destination node must have a core router at one end of the circuit. A rule may exist that a link cannot be offered more traffic than it can carry (i.e., a link specified in the model as a having a specified link capacity may not carry traffic between one or more source nodes and one or more destination nodes that aggregates to more than the specified link capacity). A rule may exist that a router port may not be offered more traffic than it can carry. A rule may exist that a link's transport channel may not be offered more traffic than it can carry.

As shown in block 450, a mixed integer solver program may be used to solve the mixed integer equations from the mixed integer program model. The mixed integer solver program may be commercial, or may be created as a part of an embodiment. One possible example of a commercial mixed integer solver program is CPLEX, manufactured by ILOG, Inc. of Mountain View, Calif. Of course, any other commercial mixed integer solver program may be used as is known in the art. The mixed integer solver program operates to solve the mixed integer programming problem and creates output data, shown in aggregate form as block 460.

Block 460 may represent the output data that may be produced by the method. The output data may include, for example, a list of the nodes which may house a core router. The output data may also include the homing plan for the edge routers to a core router. A homing plan may include the core routers to which each of the source nodes and the destination nodes connects. The output data may also include the transport capacity for each of the links. The output data may also include the link capacity required of each of the links of each of the core routers. The output data may also include the proper traffic routing for each of the nodes. The output data may also include the total cost of the network, possibly taking into consideration all of the link costs, router fixed costs, router port costs, and any other cost associated with the network. The output data may also include a warning if the requirements of the model could not be met (i.e., a link was given an amount of traffic greater than the link capacity, for example).

Figure 5:
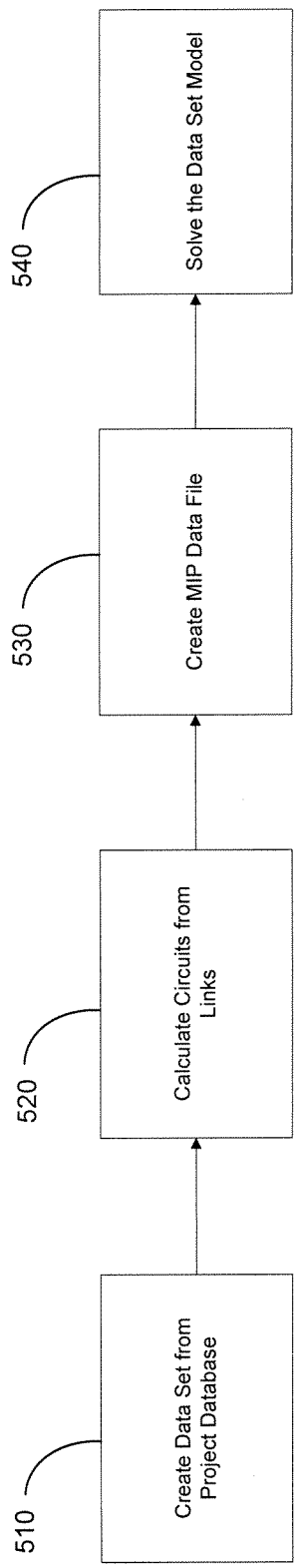
FIG. 5 is a flow chart illustrating actions of a system optimizing a network design according to an embodiment.

Turning now to FIG. 5, a flow chart is shown detailing the steps of an embodiment. In block 510, the input variables may be used to create a data set. In block 520, the circuits may be calculated from the links. The circuits may be the links that lie along the shortest path between the circuit endpoints. In block 530, the preprocessor may use the data set and the circuit calculations to create a mixed integer programming data file. In block 540, the commercial solver program may use the mixed integer programming data file to solve the model and create an optimized network.

Example 1

An example of the method of an embodiment is described below.

According to one embodiment, one possible set of input data is represented in the table depicted in FIG. 6.

An example of the mathematical model used to describe one embodiment is shown below.

$$\text{Minimize} \sum_c (N192_c * \$192_c + N786_c * \$768_c) + \quad (1)$$

$$\sum_c (NA192_c * \$192_c) + \sum_c (R_n * \$R)$$

Subject to
Indicate which nodes may and may not have routers $$R_n = 1 \forall n \text{ pre-selected as router nodes} \quad (2)$$

$$R_n = 0 \forall n \text{ not pre-selected as candidate router nodes} \quad (3)$$

Select 1 working path configuration per demand $$\sum_{p \in P_d} W_p = 1 \forall d \quad (4)$$

Select 1 protect path configuration per demand $$\sum_{p \in P_d} P_p = 1 \forall d \quad (5)$$

Each demand's working & protect configuration path must be in different configuration sets (i.e. diverse routes), unless only 1 route between demand's source & destination $$\sum_{p \in P_{dg}} W_p + P_p \le 1 + S_d \forall g \text{ configuration sets in } P_d, \forall d \quad (6)$$

If path configuration p is used, routers must be located at path configuration p's circuit junctions, as indicated in data file $$W_p + P_p \le R_n \forall n \in \{\text{circuit junctions in path configuration } p\}, \forall p \quad (7)$$

Calculate each core circuit's required bandwidth $$\sum_{p \in P | c \in \{\text{path } p \text{ core circuits}\}} (W_p + P_p) * BW_p \le CoreBW_c \forall c \quad (8)$$

Calculate best combination of OC192 and OC768 to carry core circuits' demands $$CoreBW_c \le 10E9 * N192_c + 40E9 * N768_c \forall c \quad (9)$$

Calculate access circuits required (assumes OC192s)

$$\sum_{p \in P | c \in \{path\ p\ non\text{-}core\ circuits\}} (W_p + P_p) * N192_p \leq NA192_c \forall_C \quad (10)$$

According to one embodiment, a possible set of variables representing results data is depicted in FIG. 7.

The exemplary embodiments allow for a more optimal solution for network design to be found, accomplishing this by creating a model to optimize most variables simultaneously rather than optimizing one set of variables, and then optimizing another set of variables within the constraints of the first optimization. By optimizing most of the variables at one time, the overall network may be optimized more fully than by optimizing separate sets of variables individually. Network optimization may save money by reducing the need to place expensive core routers at unnecessary nodes. Network optimization may also save money and time in maintenance costs; by creating a network with the fewest number of core routers, maintenance and upkeep for core routers is kept to a minimum.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   identifying a network topology;
   calculating circuit locations from the network topology;
   creating, via an electronic preprocessor unit, a dataset from the network topology and the circuit locations, the dataset serving as an input and comprising constraints, including:
     a maximum homing distance representing the maximum number of nodes between at least one of the one or more edge routers and at least one of the one or more core routers; and
   solving, via an electronic solver unit, the dataset to determine at least one output indicative of:
     a proposed placement of one or more core routers and one or more other routers into one or more node locations in the network topology, the proposed placement of the one or more core routers representing lowest cost and highest utilization of the one or more core routers,
     a primary path designated as a preferred working path connecting a source node and a destination node, through which the source node sends traffic,
     a secondary path designated as a protect path connecting the source node and the destination node, through which the source node is configured to send traffic in the event a portion of the preferred working path fails,
     a homing plan for one or more edge routers to the one or more core routers, and
     a link capacity for each of the one or more core routers,
   wherein the dataset comprises a plurality of variables that are optimized simultaneously to determine the output rather than optimizing one set of variables in a first optimization and then optimizing another set of variables within constraints established by the first optimization.

2. The method of claim 1, where one or more of the one or more node locations indicates possible router sites, wherein the possible router sites includes sites previously unoccupied by a router.

3. The method of claim 1, where the network topology includes one or more router cost figures.

4. The method of claim 1, where the network topology includes one or more router port cost figures.

5. The method of claim 1, where the network topology includes one or more link cost figures.

6. The method of claim 1, where the network topology includes one or more traffic demand figures.

7. The method of claim 1 where solving the dataset minimizes network transport costs.

8. The method of claim 1 where each of the preferred working path and protect path use separate links.

9. The method of claim 1 where the network is a packet-switched network.

10. The method of claim 9, where the packet-switched network is the internet.

11. The method of claim 1, where the network carries voice communication data.

12. The method of claim 1, wherein solving the dataset further determines a required transport capacity for each of the designated preferred working path and the designated protect path.

13. A system, comprising:
   a preprocessor unit which utilizes network topology information to create a dataset, the dataset comprising constraints including:
     a maximum homing distance representing the maximum number of nodes between at least one of the one or more edge routers and at least one of the one or more core routers; and
   a solver unit capable of operating on the dataset to determine at least one output indicative of:
     a proposed placement of one or more core routers and one or more other routers into one or more node locations in the network topology, the proposed placement of the one or more core routers representing lowest cost and highest utilization of the one or more core routers,
     a primary path designated as a preferred working path connecting a source node and a destination node, through which the source node sends traffic,
     a secondary path designated as a protect path connecting the source node and the destination node, through which the source node is configured to send traffic in the event a portion of the preferred working path fails,
     a homing plan for one or more edge routers to the one or more core routers, and
     a link capacity for each of the one or more core routers,
   wherein the dataset comprises a plurality of variables that are optimized simultaneously to determine the output rather than optimizing one set of variables in a first optimization and then optimizing another set of variables within constraints established by the first optimization.

14. The system of claim 13, where one or more of the one or more node locations indicates possible router sites, wherein the possible router sites includes sites previously unoccupied by a router.

15. The system of claim 13, where the network topology includes one or more router cost figures.

16. The system of claim 13, where the network topology includes one or more router port cost figures.

17. The system of claim 13, where the network topology includes one or more link cost figures.

18. The system of claim 13, where the network topology includes one or more traffic demand figures.

19. The system of claim 13 where solving the dataset minimizes transport costs.

20. The system of claim 13 where each of the preferred working path and protect path use separate links.

21. The system of claim 13 where the network is a packet-switched network.

22. The system of claim 21, where the packet-switched network is the internet.

23. The system of claim 13, where the network carries voice communication data.

* * * * *